May 9, 1967  T. HANSEN  3,318,626
DEVICE FOR HOLDING FISH AND THE LIKE
Filed Jan. 25, 1965
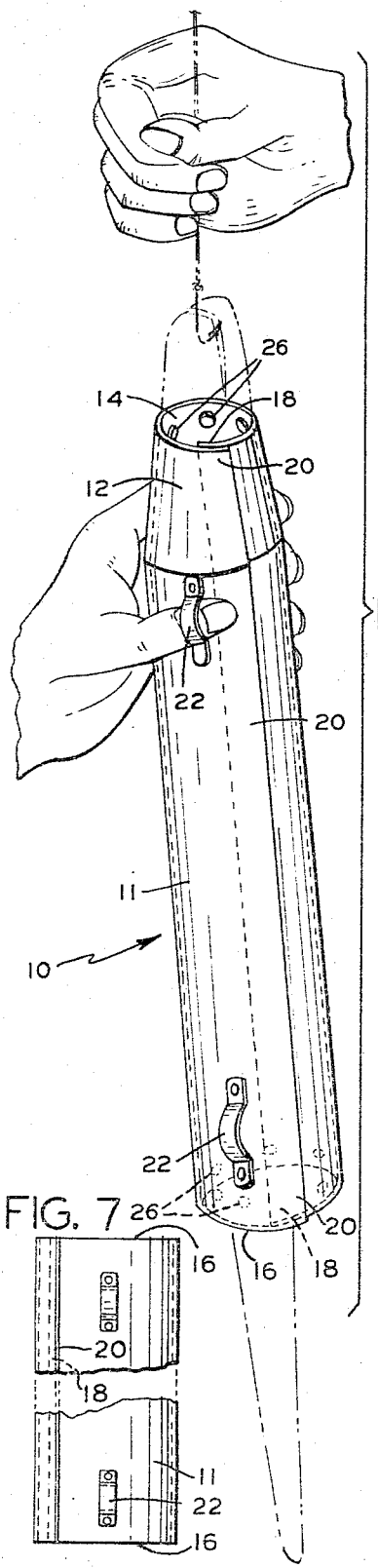
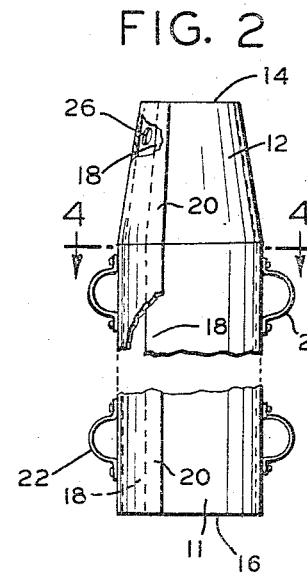
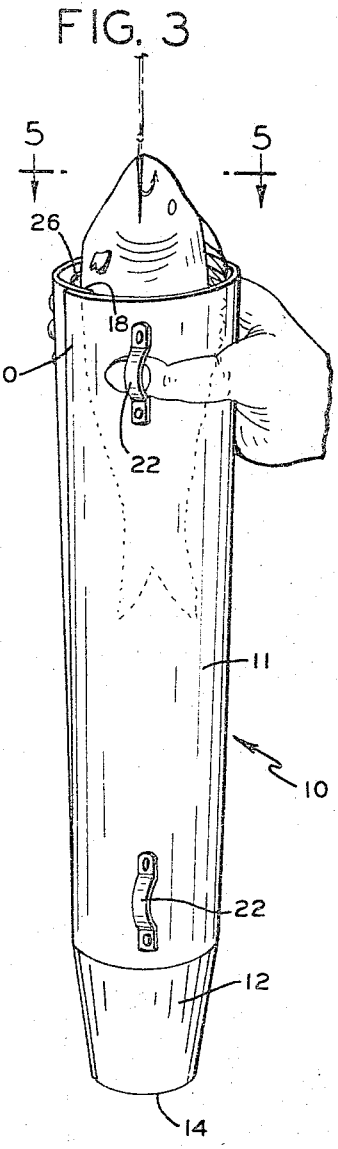
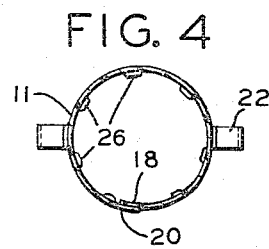
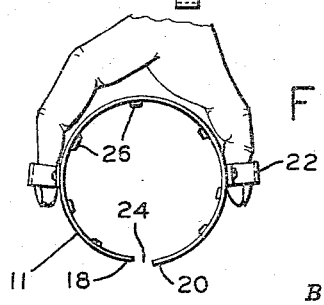
INVENTOR.
TRYGVE HANSEN
BY
Charles T. Emmons
AGENT

United States Patent Office 3,318,626
Patented May 9, 1967

3,318,626
DEVICE FOR HOLDING FISH AND THE LIKE
Trygve Hansen, 31 Blue Ridge Road,
Wilton, Conn. 06897
Filed Jan. 25, 1965, Ser. No. 427,654
1 Claim. (Cl. 294—16)

This invention relates to fishing tackle and in particular to a device for holding fish and eels while removing the hook.

Most fish, when caught with a hook and line, are extremely wiggly and difficult to grasp for removal of the hook. In fact, the fisherman often receives painful jabs from the fins of the fish as its wiggles during the process of removing the hook. Also, when an eel has been caught and it is held adjacent its head for removal of the hook, it invariably wraps its tail around the arm of the fisherman thus affording an unpleasant sensation especially to the amateur fisherman.

It is an object, therefore, of the present invention to provide a device for holding a fish or an eel while removing the hook.

Another object is to prevent the eel from wrapping its tail around the arm of the fisherman while removing the hook.

A further object is to hold the fish securely against excess wiggling while removing the hook, and thus avoiding the possibility of being jabbed by the fish fins.

One feature of the invention includes a substantially cylindrical, open-ended sleeve having a longitudinal separation line along its wall to permit the free ends formed thereby to overlap. The normally overlapping ends are free to move or slide relative to each other for opening the enclosure to receive a fish line or for diminishing the internal area of the sleeve to grip a fish therein. Finger loops are attached to the outside of the wall in proper position to permit manipulation of the sleeve by one hand.

For a better understanding of the present invention together with other and further objects, reference is had to the following description taken in conjunction with the accompanying drawings wherein:

FIG. 1 is a perspective view of the sleeve used when catching an eel.

FIG. 2 is a side elevation of the sleeve.

FIG. 3 is a perspective of the sleeve as used for catching a fish.

FIG. 4 is a sectional view taken along line 4—4 of FIG. 2.

FIG. 5 is a sectional view taken along line 5—5 of FIG. 3.

FIG. 6 is a view similar to FIG. 4 showing the ends of the wall spread apart.

FIG. 7 is a side view of a substantially cylindrical open-ended device.

As illustrated in the drawings, the sleeve, generally indicated 10 can be any desired shape, but for purposes of illustration it is shown as having a substantially cylindrical section 11 throughout the greater portion of its length and having a tapered end section 12 terminating in an open end 14 of substantially lesser diameter than the opposed open end 16. The reduced opening 14 is for the purpose of using the sleeve for holding an eel which is of smaller dimension than a fish. The larger open end 16 is, of course, for receiving a fish. This tapered, reduced end is not necessary for the functioning of the sleeve, but it is a refinement which the inventor believes will contribute to the usefulness of the sleeve.

The walls 11 and 12 are separated along a line extending between the open ends of the sleeve and the free ends, or terminals, 18 and 20 thus formed normally overlap as clearly shown in the drawings. The overlap is not secured but left free to permit the terminals 18 and 20 to move or slide relative to each other for reasons described below.

The sleeve can be constructed of any suitable material which will produce a device of the general design as illustrated and having the characteristics of being substantially rigid longitudinally to support the fish or eel against excess movement and still be substantially flexible transversely as to permit being squeezed together or collapsed for gripping a fish or eel as best illustrated in FIGS. 1 and 3.

In order to facilitate holding and manipulating the sleeve 10 it is provided with finger loops 22 for inserting the fingers when gripping the sleeve. The loops are especially useful for spreading the terminal ends 18 and 20 apart for inserting the fish line within the sleeve. This is accomplished by opening the hand, while in the finger loops, and moving the walls 11 and 12 against their own inherent resiliency as best shown in FIG. 6.

The operation of the device is as follows: With the fingers of one hand inserted into the finger loops 22, the sleeve 10 is grasped in one hand while the fish line, with the fish or eel caught on the hook, is grasped in the other hand. The sleeve is opened by spreading the hand as shown in FIG. 6 providing an opening 24 between the walls 18 and 20 to permit the fish line to be inserted within the sleeve 10. The sleeve is then allowed to close, by relaxing the hand, to its normal overlapping position due to its inherent resiliency. The fish line is then drawn through the sleeve longitudinally until the fish, or eel, is drawn into the sleeve through one open end (16, FIG. 1) and positioned with its mouth projecting from the other open end 14. In this position it is gripped firmly while the hook is removed from its mouth. A plurality of inwardly projecting buttons 26 are positioned near the gripping openings 14 and 16 to insure firmly gripping the fish or eel.

The larger opening 16 is preferably used for fish as shown in FIG. 3 and inasmuch as most fish have a narrow width, the opening 24 FIG. 6 can be spread large enough to receive the fish instead of drawing it through the open end as described above.

While there has been described and illustrated a specific embodiment of the invention, it will be obvious that various changes and modifications can be made therein without departing from the field of the invention which should be limited only by the scope of the appended claim.

I claim:

A sleeve for restraining fish and the like against excess movement while removing a hook, comprising:
(A) a substantially cylindrical wall having,
  (1) a pair of open ends;
  (2) one of said ends tapered to a reduced opening;
  (3) and having a parting line extending longitudinally of said wall between said open ends;
  (4) the terminal ends of said wall formed by said parting line normally overlapping in a manner to slide freely relative to each other when pressure is manually exerted upon the wall for resilient movement thereof;

(B) inwardly projecting gripping members attached to said wall adjacent the open ends thereof for facilitating the restraint of a fish or the like therein;
(C) a plurality of finger loops attached to the outer surface of said wall for manipulating said sleeve.

References Cited by the Examiner

UNITED STATES PATENTS

| | | | |
|---|---|---|---|
| 2,244,072 | 6/1941 | Ledbetter | 294—25 |
| 2,325,841 | 8/1943 | Faber. | |
| 2,466,719 | 4/1949 | MacKearnin. | |
| 2,757,951 | 8/1956 | Benton | 294—99 |
| 2,984,486 | 5/1961 | Jones | 273—81.2 |
| 3,181,198 | 5/1965 | Stelzen | 294—16 X |
| 3,227,455 | 1/1966 | Hulsman | 273—81.2 |

M. HENSON WOOD, JR., *Primary Examiner.*

EVON C. BLUNK, ROBERT B. REEVES, *Examiners.*

C. H. SPADERNA, J. N. ERLICH, *Assistant Examiners.*